3,036,106
ALKYL AND ACYL FERROCENES
Thomas Leigh, Macclesfield, England, assignor to Imperial Chemical Industries Limited, London, England, a corporation of Great Britain
No Drawing. Filed July 28, 1958, Ser. No. 751,116
Claims priority, application Great Britain Aug. 12, 1957
2 Claims. (Cl. 260—439)

This invention relates to new organic compounds and more particularly it relates to certain ferrocene derivatives which are useful as haematinics for the treatment of iron deficiency anaemia in man and animals.

Thus according to the invention we provide ferrocene derivatives of the formula:

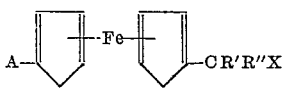

wherein A stands for hydrogen or for the group —CR'R''X, wherein X stands for a secondary or tertiary alkyl radical or for a cyclohexyl radical and R' and R'' both stand for hydrogen atoms or together they may stand for an oxygen atom.

Since dicyclopentadienyl iron is known to the art as ferrocene, the compounds of the present invention can be regarded as mono- and di-acylferrocenes and mono- and di-alkylferrocenes. The essential feature of the structure of ferrocene is the symmetrical binding of the central metal atom to all five carbon atoms of each ring and the free rotation of the two rings relative to each other. Thus when each ring is substituted by a single substituent, there is only one possible structure for such di-substituted compounds. On the basis of the known art where the stability and properties of ferrocene are explained by the pentagonal antiprism configuration, the compounds of the present invention can be regarded as having the formula:

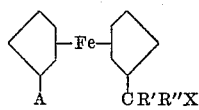

wherein A, R', R'' and X have the meaning stated above.

As suitable compounds of the above stated formula there may be mentioned for example 1:1'-di-neopentylferrocene, mono - neopentylferrocene, 1:1' - di - isobutylferrocene, mono - hexahydrobenzylferrocene, 1:1'-di - hexahydrobenzylferrocene, mono - pivalylferrocene, 1:1' - di - pivalylferrocene, mono - hexahydrobenzoylferrocene and 1:1' - di - hexahydrobenzoylferrocene and, of these, a particularly valuable compound is 1:1'-di-neopentylferrocene. In these names it will be understood that the 1:1'-numbering signifies that there is one subsitutent in each cyclopentadienyl ring.

According to a further feature of the invention we provide a process for the manufacture of those compounds of the above stated formula wherein R' and R'' stand for hydrogen which comprises reducing acyl derivatives of the formula:

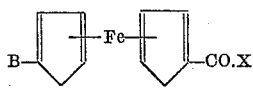

wherein B stands for hydrogen or for the group —CO.X wherein X has the meaning stated above.

The said reduction process is preferably carried out by the method known to the art as the Clemmensen reduction process or catalytically in the presence of hydrogen and a hydrogenation catalyst. The process may thus be carried out by use of a suitable reducing agent for example amalgamated zinc in the presence of aqueous alcoholic hydrochloric acid. Other reducing agents which may be used are for example hydrogen in the presence of copper chromite using ethanol as solvent or diluent or hydrogen in the presence of platinum oxide using a solvent or diluent for example acetic acid. A preferred process for the manufacture of 1:1'-di-neopentylferrocene comprises the reduction of 1:1'-di-pivalylferroecene by zinc amalgam in the presence of aqueous alcoholic hydrochloric acid.

According to a further feature of the invention we provide a process for the manufacture of those compounds of the above stated formula wherein R' and R'' together stand for an oxygen atom which comprises reacting ferrocene either with an appropriate acid halide or with the corresponding acid anhydride to provide mono- or di-acylferrocenes.

The said acid halide or acid anhydride is preferably dissolved in an inert diluent or solvent for example nitrobenzene, carbon disulphide, nitromethane or ethylene dichloride, and ferrocene is added thereto followed by an acidic catalyst under controlled temperature conditions. The reaction temperature is preferably within the range of —20° C. to 100° C. and suitable acidic catalysts may be those catalysts used in the conventional Friedel-Crafts synthesis for example aluminium chloride, boron fluoride, zinc chloride and hydrofluoric acid. In order to obtain mono- rather than di-acyl derivatives, the acid halide or acid anhydride is preferably reacted with ferrocene in the presence of anhydrous hydrofluoric acid or syrupy phosphoric acid. Suitable acid halides and acid anhydrides may be for example pivalic anhydride, pivalyl chloride, isobutyryl chloride and hexahydrobenzoyl chloride. A preferred process for the manufacture of 1:1'-di-pivalyl ferrocene comprises interaction of ferrocene and pivalyl chloride in the presence of aluminium chloride as a catalyst and ethylene dichloride as a solvent or diluent.

The invention is illustrated but not limited by the following examples in which the parts are by weight:

*Example 1*

To a solution of 3.6 parts of ferrocene in 25 parts of ethylene dichloride are added 5.4 parts pivalyl chloride. The solution is stirred and cooled to 0° C. and 6.3 parts of anhydrous aluminium chloride are added during one hour. The reaction mixture is stirred at 0° C. for a further one hour and it is then poured on to 200 parts of crushed ice. The lower ethylene dichloride layer is separated and is washed first with dilute aqueous hydrochloric acid and then with dilute aqueous sodium hydroxide and finally with water. The ethylene dichloride is distilled at a pressure of 20 mm. of mercury. The residue consists of a mixture comprising 1:1'-di-pivalylferrocene and monopivalylferrocene. By a process of fractional crystallisation from petroleum ether there are obtained 1:1'-dipivalylferrocene, M.P. 126° C. and monopivalylferrocene, M.P. 92° C.

*Example 2*

20 parts of granulated zinc are added to a solution of 2 parts of mercuric chloride in 20 parts of normal aqueous hydrochloric acid. After ten minutes the aqueous solution is decanted and the zinc amalgam is added to a mixture of 40 parts of ethyl alcohol, 60 parts of concentrated aqueous hydrochloric acid and 6 parts of 1:1'-di-pivalylferrocene (obtained as described in Example 1). The mixture is stirred and heated under reflux for 6 hours. The precipitated oil is decanted whilst hot from unused zinc and is then allowed to crystallise. It is washed with water and recrystallised from ethyl alcohol to give 1:1'-di-neopentylferrocene, M.P. 68° C.

Example 3

36 parts of pivalyl chloride are added slowly, with stirring, to 150 parts of anhydrous hydrofluoric acid at 0° C. The stirring is continued at this temperature and 45 parts of ferrocene are added during 15 minutes. The temperature is raised to 20° C. and after one hour the reaction mixture is poured on to crushed ice. The mixture is filtered and the solid residue is washed free of acid and dried. It is then crystallised from petroleum ether to give mono-pivalylferrocene, M.P. 92° C.

Example 4

The reduction process as described in Example 2 is repeated except that 6 parts of 1:1'-di-pivalylferrocene are replaced by 6 parts of monopivalylferrocene (obtained as described in Example 3). There is thus obtained in a similar manner, mono-neopentylferrocene, M.P. 62° C.

Example 5

117 parts of isobutyryl chloride are added to a solution of 93 parts of ferrocene in 400 parts of ethylene dichloride. The reaction mixture is stirred and cooled to 10° C. and 155 parts of aluminium chloride are added during one hour. The mixture is stirred at 20° C. for a further two hours and is then poured on to crushed ice. The lower ethylene dichloride layer is separated and is washed successively with dilute aqueous sodium hydroxide and water. The ethylene dichloride is then distilled at a pressure of 20 mm. of mercury. The residue is 1:1'-di-isobutyryl-ferrocene which when crystallised from petroleum ether has M.P. 53° C.

Example 6

Amalgamated zinc, prepared from 20 parts of granulated zinc in the manner as described in Example 2, is added to 50 parts of 7 N aqueous hydrochloric acid. 6 parts of 1:1'-di-isobutyrylferrocene (obtained as described in Example 5) are then added and the mixture is stirred and heated under reflux during twenty hours. The reaction mixture is then cooled and extracted with ether. The ethereal extract is washed successively with dilute aqueous hydrochloric acid, dilute aqueous sodium hydroxide and water. The ethereal solution is then evaporated and there is obtained 1:1'-di-isobutylferrocene as an orange coloured oil. It is purified by chromatography by passing a solution of it in petroleum ether through a column of alumina. There is thus obtained 1:1'-di-isobutylferrocene, B.P. 97° C./0.5 mm.

Example 7

30 parts of hexahydrobenzoyl chloride are added to 150 parts of anhydrous hydrofluoric acid stirred and cooled to 0° C. The stirring is continued and 31 parts of ferrocene are added during 15 minutes. The temperature is raised to 20° C. and after one hour the mixture is poured on to crushed ice. The mixture is filted and the solid residue is washed and dried. It is recrystallised from petroleum ether and there is thus obtained hexa-hydrobenzoylferrocene, M.P. 79° C.

Example 8

The process as described in Example 2 is repeated except that the 6 parts of 1:1'-di-pivalylferrocene used as starting material are replaced by 6 parts of mono-hexahydrobenzoylferrocene (obtained as described in Example 7). There is thus obtained mono-hexahydrobenzylferrocene which when crystallised from petroleum has M.P. 52° C.

Example 9

72 parts of hexahydrobenzoyl chloride are added to a solution of 46 parts of ferrocene in 300 parts of ethylene dichloride. The solution is stirred and cooled to 5° C. and 78 parts of anhydrous aluminium chloride are added during one hour. The reaction mixture is stirred at 20° C. for a further one hour and is then poured on to crushed ice. The lower ethylene dichloride layer is treated in a similar manner as that described at the end of Example 5 and there is thus obtained 1:1'-di-hexahydrobenzoylferrocene, M.P. 135° C.

Example 10

The process as described in Example 2 is repeated except that the 6 parts of 1:1'-dipivalylferrocene used as starting material are replaced by 6 parts of 1:1'-di-hexahydrobenzoylferrocene (obtained as described in Example 9). There is thus obtained 1:1'-di-hexahydrobenzylferrocene, M.P. 73° C.

Example 11

7.1 parts of powdered zinc chloride are added to a solution of 3.6 parts of ferrocene and 5.4 parts of pivalyl chloride in 50 parts of ethylene dichloride. The mixture is stirred at 70° C. for three hours and is then poured on to 50 parts of crushed ice. The lower ethylene dichloride layer is separated and is then treated according to the procedure as described in Example 1. There is thus obtained a mixture of mono- and 1:1'-di-pivalylferrocene, M.P. 92° C. and 126° C. respectively.

Example 12

To a solution of 14.7 parts of ferrocene in 100 parts of ethylene dichloride are added 20 parts of pivalic anhydride. The solution is stirred and cooled to 5° C. and then 37.6 parts of anhydrous aluminium chloride are added over 30 minutes. The reaction mixture is stirred at 25° C. for two hours and is then poured on to crushed ice. The ethylene dichloride layer is separated and is then treated according to the procedure as described in Example 1. There is thus obtained 1:1'-di-pivalylferrocene, M.P. 126° C. and mono-pivalyferrocene, M.P. 92° C.

Example 13

0.5 part of platinum oxide is added to a mixture of 5 parts of 1:1'-di-pivalylferrocene and 100 parts of acetic acid. The mixture is stirred at 25° C. in the presence of hydrogen at a pressure of 5 atmospheres for 48 hours. The mixture is filtered and the filtrate is evaporated under reduced pressure to a red oil. The oil is washed with water and dried over anhydrous sodium sulphate. By chromatography using petroleum ether and alumina there is obtained 1:1'-di-neopentylferrocene, M.P. 68° C.

What I claim is:

1. A ferrocene derivative having a formula selected from the group consisting of

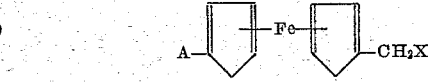

and

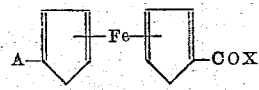

wherein A is selected from the group consisting of hydrogen, —CH$_2$X and —COX, wherein X is selected from the group consisting of s-butyl, t-butyl, and cyclohexyl.

2. Compounds as claimed in claim 1 which are selected from the group consisting of 1:1'-di-neopentylferrocene, mono-neopentylferrocene, mono-hexahydrobenzylferrocene, 1:1'-di-hexahydrobenzylferrocene, mono-pivalylferrocene, 1:1'-di-pivalylferrocene, mono-hexahydrobenzoylferrocene and 1:1'-di-hexahydrobenzoylferrocene.

References Cited in the file of this patent

UNITED STATES PATENTS 2,135,031    Brown    Nov. 1, 1938
2,810,737    Haven    Oct. 22, 1957

(Other references on following page)

UNITED STATES PATENTS

| | | |
|---|---|---|
| 2,898,359 | Leedham | Aug. 4, 1959 |
| 2,898,360 | Hogan | Aug. 4, 1959 |
| 2,957,806 | Rummel | Oct. 25, 1960 |

FOREIGN PATENTS

| | | |
|---|---|---|
| 763,550 | Great Britain | Dec. 12, 1956 |

OTHER REFERENCES

Woodward et al.: J.A.C.S., vol. 74, pages 3458–3459, July 1952.

Wagner et al.: Synthetic Organic Chemistry, pages 5 and 6, 1953.

Rosenblum: Thesis on Ferrocene, Deposited for use in Harvard's main library, February 19, 1954, pages 18 to 21 and 35 to 37.